United States Patent
Sanghavi et al.

(10) Patent No.: US 11,032,347 B2
(45) Date of Patent: Jun. 8, 2021

(54) BANDWIDTH USAGE REDUCTION EMPLOYING MEDIA TREADING WITH REDUCTIVE EDGING

(71) Applicant: Sony Interactive Entertainment LLC, San Mateo, CA (US)

(72) Inventors: Bhumik Sanghavi, Santa Clara, CA (US); Alex Hwang, Orinda, CA (US); Joel Freeman, San Rafel, CA (US)

(73) Assignee: SONY INTERACTIVE ENTERTAINMENT LLC, San Mateo, CA (US)

( * ) Notice: Subject to any disclaimer, the term of this patent is extended or adjusted under 35 U.S.C. 154(b) by 0 days.

(21) Appl. No.: 16/376,346

(22) Filed: Apr. 5, 2019

(65) Prior Publication Data
US 2020/0322411 A1  Oct. 8, 2020

(51) Int. Cl.
| | | |
|---|---|---|
| *G06F 15/16* | (2006.01) | |
| *H04L 29/06* | (2006.01) | |
| *H04N 21/433* | (2011.01) | |
| *H04L 12/24* | (2006.01) | |
| *H04N 21/262* | (2011.01) | |
| *H04N 21/845* | (2011.01) | |

(52) U.S. Cl.
CPC ............. *H04L 65/80* (2013.01); *H04L 41/16* (2013.01); *H04L 65/4084* (2013.01); *H04N 21/26258* (2013.01); *H04N 21/4331* (2013.01); *H04N 21/8456* (2013.01)

(58) Field of Classification Search
CPC . H04L 67/2847; H04L 67/2842; H04L 67/22; H04L 67/306; G06F 16/9574
See application file for complete search history.

(56) References Cited

U.S. PATENT DOCUMENTS

| | | | | |
|---|---|---|---|---|
| 2005/0193414 A1* | 9/2005 | Horvitz | ............... | H04N 21/482 725/46 |
| 2008/0216107 A1* | 9/2008 | Downey | .......... | H04N 21/47202 725/22 |
| 2017/0104840 A1* | 4/2017 | Spagnola | ............. | H04L 67/303 |
| 2018/0220198 A1* | 8/2018 | Matthews | ........... | H04N 21/812 |
| 2018/0352269 A1* | 12/2018 | Patil | ................ | H04N 21/23106 |
| 2018/0365270 A1* | 12/2018 | Azout | .................... | G06F 3/011 |
| 2019/0028743 A1* | 1/2019 | He | .................. | H04N 21/25891 |

(Continued)

OTHER PUBLICATIONS

International Search Report and Written Opinion dated May 15, 2020 for International Patent Application No. PCT/US20/23992.

*Primary Examiner* — Brian Whipple
*Assistant Examiner* — Gregory P Tolchinsky
(74) *Attorney, Agent, or Firm* — JDI Patent; Joshua Isenberg; Robert Pullman (57) ABSTRACT

A method system and computer program product for bandwidth usage reduction in media streaming, comprises, receiving user streaming information from a client device and refining a user model with the user streaming information. The user streaming information reflects a user's media consumption habits. Subsequently a request for a media playlist from the client device is received and media segments are prospectively requested based on the user model before receiving a request for the media segments. The requested media playlist is sent to the client device; and the prospectively requested media segments are sent upon receiving a request for a media segment from the client device.

20 Claims, 4 Drawing Sheets

(56) References Cited

U.S. PATENT DOCUMENTS

2019/0089643 A1* 3/2019 Westphal ............. H04N 21/238
2019/0095054 A1* 3/2019 Peng ..................... G06F 3/0482
2019/0356588 A1* 11/2019 Shahraray ................ G06N 3/08

* cited by examiner

BANDWIDTH USAGE REDUCTION EMPLOYING MEDIA TREADING WITH REDUCTIVE EDGING

FIELD OF THE INVENTION

Aspects of the present disclosure generally relate to streaming media and more particularly to reduction of bandwidth usage in streaming media using reductive edging techniques.

BACKGROUND OF THE INVENTION

A user's watch habits often reflect that they do not fully watch an episode, show, program or content in one continuous session and jump to the next one. Depending on the encoding standard and/or the buffer available on the client devices, players reflect a greedy behavior where they download all available media segments of an asset that is being played.

For example, a TCP protocol would fully download a progressive mp4 asset on a browser environment on a laptop device even if the video is paused. This inherent greedy behavior of the streaming media devices is to ensure best playback experience on the user device and reduce network errors. However, these algorithms do not consider the user's watch habits when downloading media segments. More often, a user does not fully watch the program and the content downloaded ends up as simply being a waste of network and provider bandwidth.

It is within this context that aspects of the present disclosure arise.

BRIEF DESCRIPTION OF THE DRAWINGS

Objects and advantages of aspects of the present disclosure will become apparent upon reading, the following detailed description and upon reference to the accompanying drawings in which.

DESCRIPTION OF THE SPECIFIC EMBODIMENTS

Although the following detailed description contains many specific details for the purposes of illustration, anyone of ordinary skill in the art will appreciate that many variations and alterations to the following details are within the scope of the invention. Accordingly, the exemplary embodiments of the invention described below are set forth without any loss of generality to, and without imposing limitations upon, the claimed invention.

Introduction

Aspects of the present disclosure involve prospectively requesting media segments based on a user model before receiving a request for the media segments. The user model is based on user streaming information that reflects a user's media consumption habits. By way of example, and not by way of limitation, the probability of a user abandoning a video at the onset is much higher and decreases as the user spends more time watching the content. The time spent by a user watching streaming content is therefore a good indicator of engagement and may be a valid metric of user behavior with respect to consumption of media. In some implementations, the type of video can also play a role in this. For example if historical data shows that the user binge watches a certain television series this information can be used as a metric in the algorithm when playing that show as opposed to a new show the user has never seen before. The model may also take into account historical information regarding how much time a user spends consuming media content (e.g., watching videos or listening to audio or reading text) before switching to other content. Alternatively, the model may take into account historical information regarding what fraction of an item of content the user tends to consume.

Figure 1:
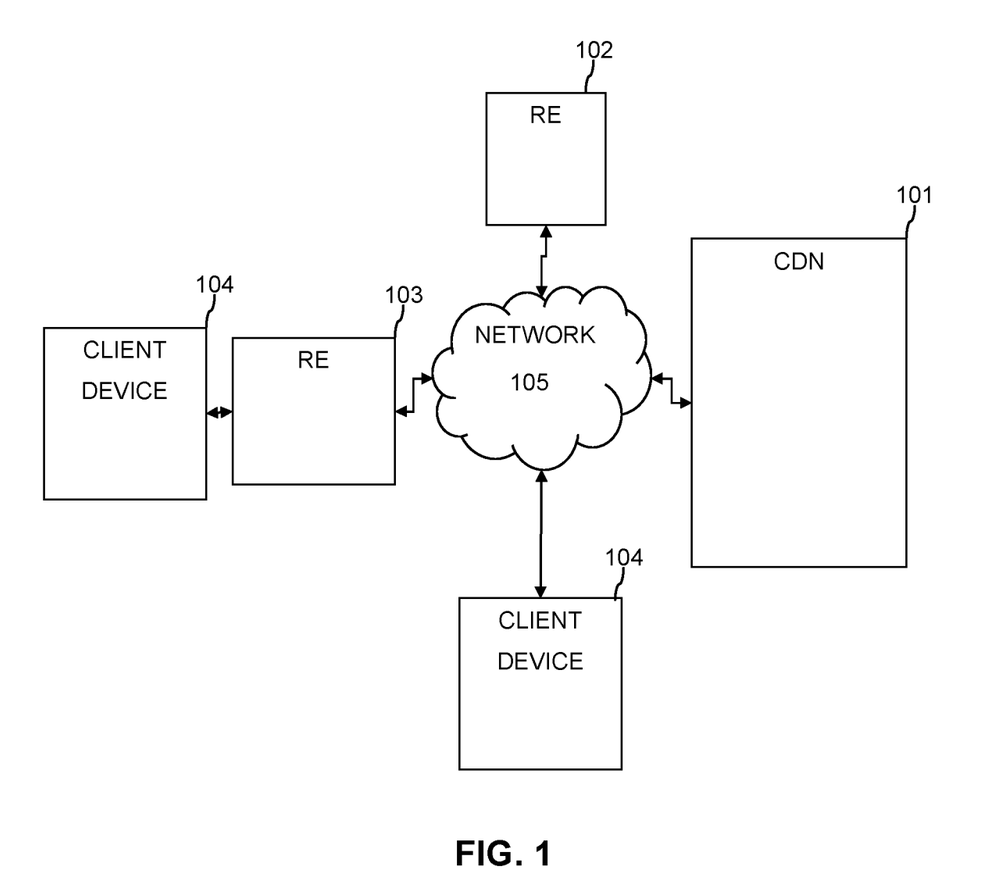
FIG. 1 is a block diagram showing the network lay of a reductive edging system according to aspects of the present disclosure.

FIG. 1 is a block diagram showing the network lay of a reductive edging system according to aspects of the present disclosure. A remote reductive edging device 102 may be a connected to a network 105 and communicatively coupled to a client device 104 and a Content Delivery Network Server (CDN) 101 through the network 105. In other embodiments, the client device 104 is directly connected to an OTT device 103 through for example and without limitation, an Ethernet cable, Universal Serial Bus (USB) cable, or similar. In some embodiments, the directly connected OTT device 103 may be a reductive edging device communicative coupled to the CDN 101 through the network 105. In other embodiments, the OTT device 103 is also communicatively coupled to the remote reductive edging device 102.

According to aspects of the present disclosure, a reductive edging device having a predictive user model that decreases the bandwidth usage during streaming and while prospectively caching media segments. A reductive edger works across all client devices to improve streaming media start times. The reductive edger generally improves streaming media times by performing network handshaking operations and storing network information before a client device requires these operations. The reductive edger may also employ prospective caching of media segments before the media segments are requested by the client device. These operations are described in Co-pending application Ser. No. 16/191,341 the contents of which are incorporated by reference herein for all purposes.

Method for Bandwidth Usage Reduction

Figure 2:
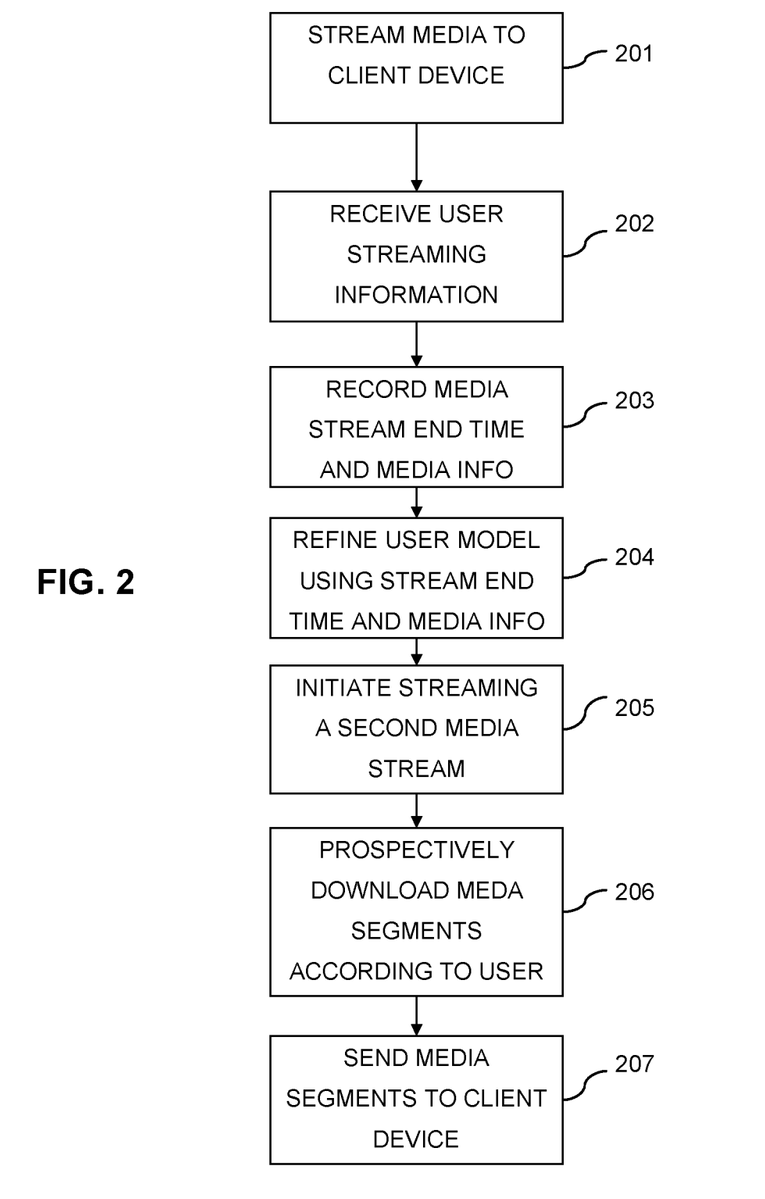
FIG. 2 is flow diagram that depicts the method for bandwidth usage reduction in media streaming according to aspects of the present disclosure.

FIG. 2 depicts the method for bandwidth usage reduction in media streaming according to aspects of the present disclosure. Initially the reductive edger device having a predictive user model may prospectively download playlists and media segments as discussed above. Playlists and media segments are sent to the client device upon request 201. While streaming media segments the Reductive Edging device (RE) may monitor the streaming progress of the client device 202 using user streaming information received from the client device.

By way of example and not by way of limitation the RE may monitor requests for segments sent to RE from the client device. The RE may compare the length of a media segment to the length of time between the time the media segment was sent and the next media segment request is received to determine the user's behavior. By way of example, and not by way of limitation, a time length between sending the media segment and receiving a request for another media segment may indicate that the user has paused or stopped the stream. The RE may also monitor the media information requested by the client device to determine when the user has stopped streaming one media title and begun streaming another different media title. For example and without limitation after sending a media segment to a client device a request for a media playlist for a different media title indicates that the user has stopped streaming a first media title. In some embodiments of the present disclosure, the client device may communicate to the RE the position of the play head of the media player during playback of the media segments. The RE may be made aware of all video related requests from a client. Monitoring connotes reading or even capturing information. The key here is what to infer or learn from the captured information.

The RE may take the user streaming information and store it 203. The user streaming information is then used to refine a user model 204. One of the RE's capabilities is to remediate a client's shortcomings. A client might be very greedy and buffer an unnecessarily large amount of video data that is ultimately wasted. In such situations, the may temper a client's requests knowing, for example, a client already received and buffered a significant amount of data and additional acquisition is likely to be wasteful. By moderating excessive requests, waste may be minimized without risking a user's experience.

By way of example and not by way of limitation the RE may have a user model that describes the user's streaming habits. This user model may include by way of example and not by way of limitation a series of thresholds describing the amount of media segments to be downloaded and held in the cache at time points during streaming. These thresholds may represent the average length of time the user streams a media title based on the current position of the media player in a media title. In this case user streaming information such as the length of time the media title has been streaming and point at which the user has stopped streaming may be averaged with the user model at the relevant thresholds to refine the user model. Each user model may be customized based on: client device, user biographical information, or user identifier such as a user account or user identification number. In addition to the static demographic information, the model may be customized based on factors such as a user's viewing habits (e.g., scrolling, trick playback, etc.), content, genre, time of day, week, month, year, current events (natural disaster, elections, etc.) In some implementations the model may be customized based on sporting event schedules, e.g., NFL, MLB etc. For example, suppose a user regularly watches a DVR of Formula One racing every Saturday morning at approximately the same time. When the Formula One racing season starts the model could predict that the user is likely to watch this content from start to finish, as opposed to on a Wednesday where the user is more likely to Channel/Content Surf.

In some embodiments, the user model also accounts for media genre and each threshold in the user model may be different depending on the genre of the media title. In alternative embodiments, the user model is a Neural Network trained to predict the amount of media segments to be downloaded and cached based on the length of time a media title has been watched. The user streaming information may be provided to the neural network and a machine-learning algorithm may be used to further train the neural network with user streaming information. All of the previously mentioned factors can be input to the neural net model. The neural model may be modest, e.g., a shallow learning model, since it is only about a given user and the 'training' process can work in the background.

Subsequently, the client device may initiate streaming on another media title 205. The RE uses the refined user model to cache media segments before receiving a request for the media segments from the client device 206. Upon receiving a request for a media segment, the RE sends the media segment to the client device 207. As streaming continues, additional media segments may be downloaded before being requested by the client device based on the refined user model.

System for Bandwidth Usage Reduction

Figure 3:
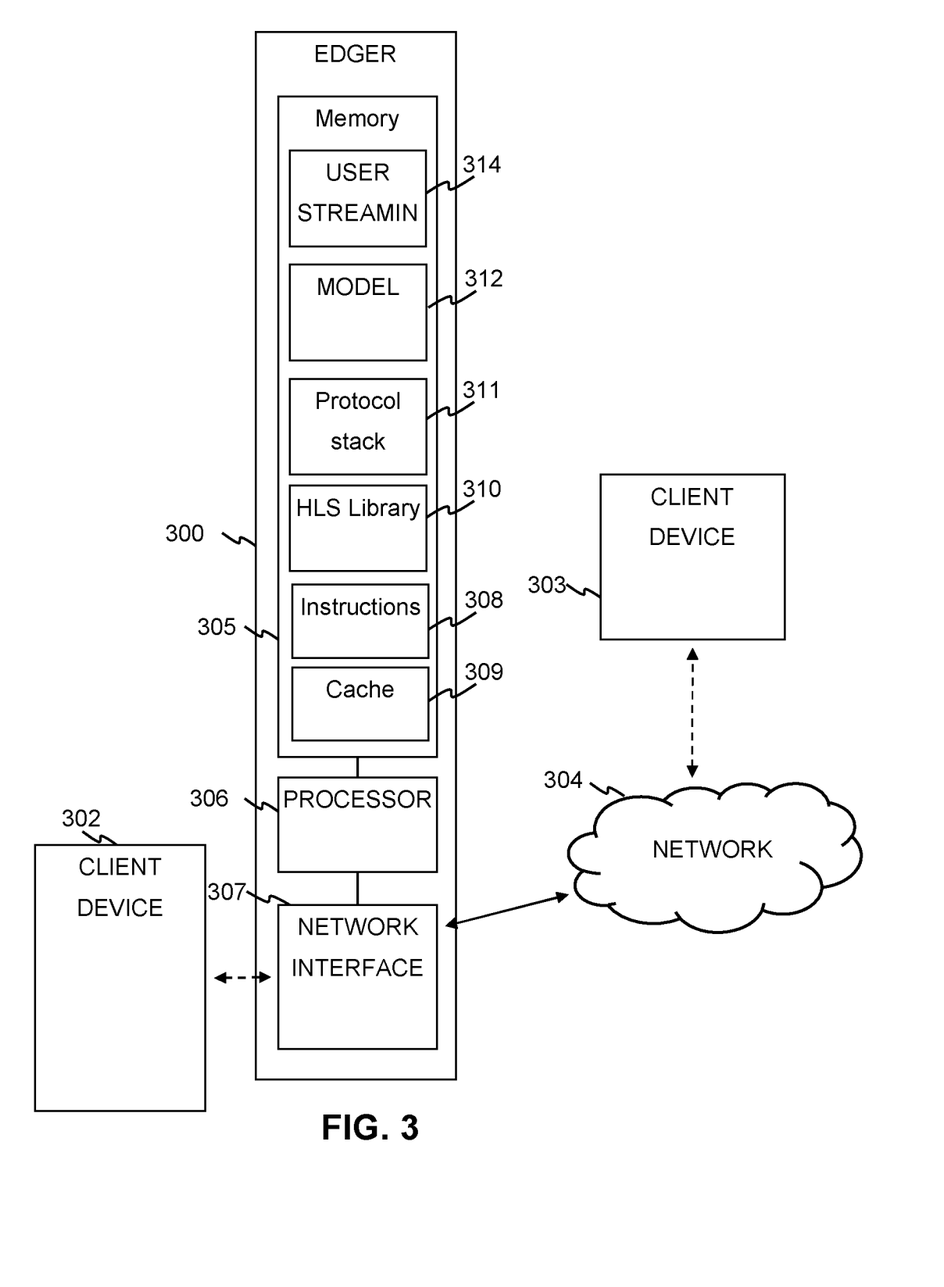
FIG. 3 is a block system diagram that shows a standalone Reductive Edging device according to aspects of the present disclosure

FIG. 3 shows a standalone Reductive Edging device according to aspects of the present disclosure. The standalone Reductive Edging device or Edger 300 may be coupled to a local OTT device or client device 302 through a network interface 307 over a LAN or WAN. In other alternative implementation the standalone Reductive Edging device may be in communication through the network interface 307 with a non-local device 303 e.g., servers or another client, through a large network 304 such as the internet. In some implementations the client device is connected to the stand alone Reductive Edging device through a communication bus (not shown) such as, without limitation, a peripheral interconnect (PCI) bus, PCI express bus, Universal Serial Bus (USB), Ethernet port, Fire-wire connector or similar interface.

The standalone Reductive Edging device 300 may include one or more processor units 306, which may be configured according to well-known architectures, such as, e.g., single-core, dual-core, quad-core, multi-core, processor-coprocessor, cell processor, and the like. The standalone Reductive Edging device 300 may also include one or more memory units 305 (e.g., random access memory (RAM), dynamic random access memory (DRAM), read-only memory (ROM), and the like).

The processor unit 306 may execute one or more instructions 308, portions of which may be stored in the memory 305 and the processor 306 may be operatively coupled to the memory through a bus or bus type connection. The instructions 308 may be configured to implement the method for bandwidth usage reduction in streaming systems shown in FIG. 2 as well as instructions for refining a user model. Additionally the Memory 305 may contain instructions for storing Playlists and Link locations and a Protocol Stack defining HLS server locations.

The Memory 305 may also contain the HLS Library 310, user streaming data 314, a Protocol Stack 311, and a user model 312. The user model 312 could be static for simplicity or dynamic like a shallow learning neural net, as discussed above. Once a user model has been formed, one merely supplies the input and the model can produce guidance on whether to temper user requests to better manage bandwidth usage. As used, herein, the term "protocol stack" or network stack refers to an implementation of a computer networking protocol suite or protocol family. In general terms, a protocol suite is a definition of a communication protocol, and a protocol stack is the software implementation of the protocol suite. Individual protocols within a suite are often designed as software modules, each having a single purpose in mind to facilitate design and evaluation. Because each protocol module usually communicates with two others, they are commonly imagined as layers in a stack of protocols. The lowest level protocol deals with low-level interaction with the communications hardware. Higher layers add more features and capability. User applications usually deal only with the topmost layers.

By way of example, and not by way of limitation, the protocol stack 311 may include the following protocols at the following layers: Hyper Text Transfer Protocol (HTTP) at the Application layer; Transfer Control Protocol (TCP) at the Transport layer; Internet Protocol (IP) at the Internet/Network Layer; Ethernet at the Data Link/Link layer; and IEEE 802.3u at the Physical layer.

The instructions 308 may further implement analyzing link locations within web resources and storing the URL of the links and location of the links within the converted video frame 314. The Cache 309 may also be located in memory 305.

The standalone Reductive Edging device 300 may include a network interface 307 to facilitate communication via an electronic communications network 304. The network interface 307 may be configured to implement wired or wireless communication over local area networks and wide area networks such as the Internet. The device 300 may send and receive data and/or requests for files via one or more message packets over the network 304. Message packets sent over the network 304 may temporarily be stored in a cache 309 in memory 305. The client device 302 may connect through the network interface 307 to the electronic communications network 304. Alternatively, the client device 303 may be in communication with the standalone Reductive Edging device 300 over the electronic communication network 304.

Figure 4:
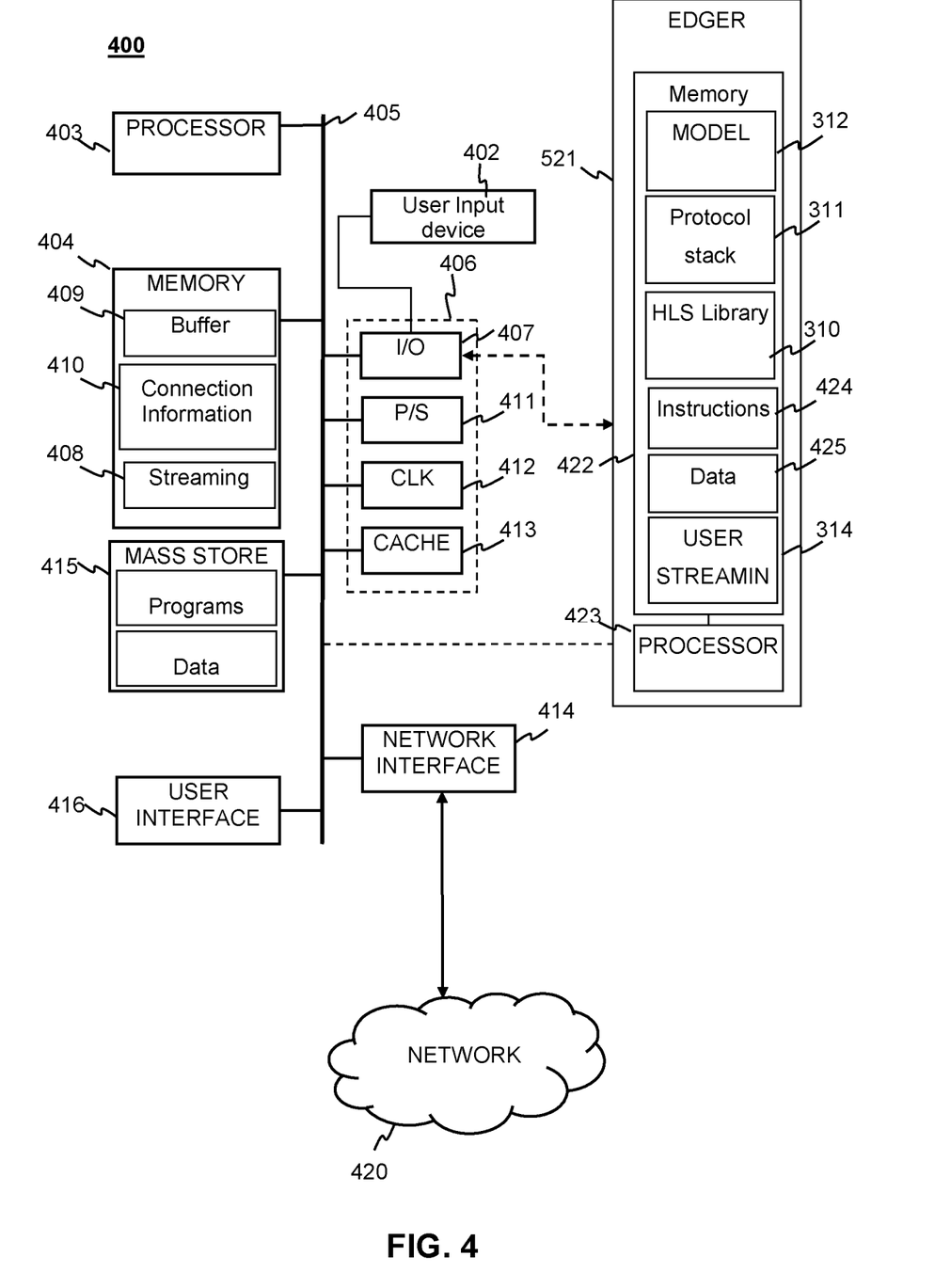
FIG. 4 is a block system diagram that depicts an embedded Reductive Edging system according to aspects of the present disclosure

FIG. 4 depicts an embedded Reductive Edging system 400 according to aspects of the present disclosure. In general, the Reductive Edging System 400 may be embedded anywhere that can access both content and the client device. By way of example, and not by way of limitation, the embedded Reductive Edging system may be embedded in a CDN server, an OTT device, e.g., a television, coupled to a user's input device 402. The user's input device 402 may be a controller, touch screen, microphone, keyboard, mouse, joystick or other device that allows the user to input information including sound data in to the system.

The computing device of the embedded Reductive Edging system 400 may include one or more processor units 403, which may be configured according to well-known architectures, such as, e.g., single-core, dual-core, quad-core, multi-core, processor-coprocessor, cell processor, and the like. The computing device may also include one or more memory units 404 (e.g., random access memory (RAM), dynamic random access memory (DRAM), read-only memory (ROM), and the like).

The processor unit 403 may execute one or more programs, portions of which may be stored in the memory 404 and the processor 403 may be operatively coupled to the memory, e.g., by accessing the memory via a data bus 405. The programs may be configured to implement streaming media through HLS systems 408. Additionally the Memory 404 may contain information about connections between the system and one or more streaming servers 410. The Memory 404 may also contain a buffer of media segments 409. The Media segments and connection information may also be stored as data 418 in the Mass Store 418.

The computing device 400 may also include well-known support circuits, such as input/output (I/O) 407, circuits, power supplies (P/S) 411, a clock (CLK) 412, and cache 413, which may communicate with other components of the system, e.g., via the bus 405. The computing device may include a network interface 414. The processor unit 403 and network interface 414 may be configured to implement a local area network (LAN) or personal area network (PAN), via a suitable network protocol, e.g., Bluetooth, for a PAN. The computing device may optionally include a mass storage device 415 such as a disk drive, CD-ROM drive, tape drive, flash memory, or the like, and the mass storage device may store programs and/or data. The computing device may also include a user interface 416 to facilitate interaction between the system and a user. The user interface may include a monitor, Television screen, speakers, headphones or other devices that communicate information to the user.

The computing device 400 may include a network interface 414 to facilitate communication via an electronic communications network 420. The network interface 414 may be configured to implement wired or wireless communication over local area networks and wide area networks such as the Internet. The device 400 may send and receive data and/or requests for files via one or more message packets over the network 420. Message packets sent over the network 420 may temporarily be stored in a buffer 409 in memory 404.

In some implementations, the embedded Reductive Edging or embedded Edger 421 may be an embedded hardware component of a CDN server 400, which may be coupled to the main processor via the bus and requests may be received from applications, e.g., streaming applications, running on the client device. In some implementations, the embedded Edger 421 may initiate and intercept network communications directed toward a CDN or other servers. In these implementations, the embedded Edger 421 may lack a network interface or the network interface may not be used. In other implementations, the embedded Edger, the functions of the edger may be implemented in streaming software 408 stored in the memory 404 or in programs 417 stored in the mass store 415 and executed on the processor 403.

In some alternative implementation the embedded Edger 421 may be an external device coupled to the client device 400, e.g., via a local non-network connection, such as the I/O functions 407.

The processor of the embedded Edger unit 421 may execute one or more instructions 424, portions of which may be stored in the edger memory 422 and the processor 423 may be operatively coupled to the memory 422 through a bus or bus type connection. The instructions 424 may be configured to implement the method for implementing interactive video in non-browser based streaming systems shown in FIG. 2. Additionally the Memory 422 may contain instructions for storing Playlists and a Protocol Stack defining HLS server locations. The Memory 422 may also contain the HLS Library 310, the Protocol Stack 311, user streaming data 314 and a user model 312. The instructions 324 may further implement storage of media segments as data 325 during operation. The instructions 424 may further implement using user information for refinement of a user model 314. Alternatively the HLS Library, Protocol stack and media segments may be stored on the client device 400 in the buffer 408 or as connection information 408 in memory 404 or as data 418 in the Mass Store 415.

In the interest of clarity, not all of the routine features of the implementations described herein are shown and described. It will be understood by those skilled in the art that in the development of any such implementations, numerous implementation-specific decisions must be made in order to achieve the developer's specific goals, such as compliance with application- and business-related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of the present disclosure.

In accordance with aspects of the present disclosure, the components, process steps, and/or data structures may be implemented using various types of operating systems; computing platforms; user interfaces/displays, including personal or laptop computers, video game consoles, PDAs and other handheld devices, such as cellular telephones, tablet computers, portable gaming devices; and/or general purpose machines. In addition, those of ordinary skill in the art will recognize that devices of a less general purpose nature, such as hardwired devices, field programmable gate arrays (FOGs), application specific integrated circuits (ASICs), or the like, may also be used without departing from the scope and spirit of the inventive concepts disclosed herein.

While the above is a complete description of the preferred embodiment of the present invention, it is possible to use various alternatives, modifications and equivalents. Therefore, the scope of the present invention should be determined not with reference to the above description but should, instead, be determined with reference to the appended claims, along with their full scope of equivalents. Any feature, whether preferred or not, may be combined with any other feature, whether preferred or not. In the claims that follow, the indefinite article "A", or "An" refers to a quantity of one or more of the item following the article, except where expressly stated otherwise. The appended claims are not to be interpreted as including means-plus-function limitations, unless such a limitation is explicitly recited in a given claim using the phrase "means for."

What is claimed is:

1. A method for bandwidth usage reduction in media streaming, comprising:
    receiving user streaming information from a client device, wherein the user streaming information reflects a user's media consumption habits including viewing habits depending on media title genre;
    refining a user model with the user streaming information wherein the user model includes at least one threshold for an amount of media segments to be downloaded and held in the cache at a time point during streaming based on the user streaming information including viewing habits depending on media title genre wherein each threshold is different depending on the genre of the media title;
    receiving a request for a media playlist from the client device;
    prospectively requesting a media segment based on the user model before receiving a request for the media segments;
    sending the requested media playlist to the client device; and
    sending the prospectively requested media segments upon receiving a request for a media segment from the client device.

2. The method of claim 1 wherein receiving user streaming information includes at least requests for media segments from the client device and determining the time between requests for media segments and the time length of each media segment.

3. The method of claim 2 wherein receiving user streaming information also includes media information.

4. The method of claim 2 wherein the user model changes based on the media information.

5. The method of claim 1, wherein receiving user streaming information includes the play head position for the media playing on the client device.

6. The method of claim 1 wherein refining a user model with the user streaming information includes at least changing a threshold level for segments in a cache based on the user streaming information.

7. The method of claim 1 wherein refining a user model includes training a neural network using a machine learning algorithm.

8. A system for bandwidth usage reduction in media streaming comprising:
    a processor;
    memory coupled to the processor;
    non-transitory instructions in the memory that when executed cause the processor to carry out the method comprising:
    receiving user streaming information from a client device, wherein the user streaming information reflects a user's media consumption habits including viewing habits depending on media title genre;
    refining a user model with the user streaming information wherein the user model includes at least one threshold for an amount of media segments to be downloaded and held in the cache at a time point during streaming based on the user streaming information including viewing habits depending on media title genre, wherein each threshold is different depending on the genre of the media title;
    receiving a request for a media playlist from the client device;
    prospectively requesting a media segment based on the user model before receiving a request for the media segments;
    sending the requested media playlist to the client device; and
    sending the prospectively requested media segments upon receiving a request for a media segment from the client device.

9. The system of claim 8 wherein receiving user streaming information includes at least requests for media segments from the client device and determining the time between requests for media segments and the time length of each media segment.

10. The system of claim 9 wherein receiving user streaming information also includes media information.

11. The system of claim 9 wherein the user model changes based on the media information.

12. The system of claim 8, wherein receiving user streaming information includes the play head position for the media playing on the client device.

13. The system of claim 8 wherein refining a user model with the user streaming information includes at least changing a threshold level for segments in a cache based on the user streaming information.

14. The system of claim 8 wherein refining a user model includes training a neural network using a machine learning algorithm.

15. A non-transitory computer readable medium with computer readable instructions embedded thereon that cause a computer to carry out the method comprising:
    receiving user streaming information from a client device, wherein the user streaming information reflects a user's media consumption habits including viewing habits depending on media title genre;

refining a user model with the user streaming information wherein the user model includes at least one threshold for an amount of media segments to be downloaded and held in the cache at a time point during streaming based on the user streaming information including viewing habits depending on media title genre, wherein each threshold is different depending on the genre of the media title;

receiving a request for a media playlist from the client device;

prospectively requesting a media segment based on the user model before receiving a request for the media segments;

sending the requested media playlist to the client device; and sending the prospectively requested media segments upon receiving a request for a media segment from the client device.

16. The non-transitory computer readable medium of claim 15 wherein receiving user streaming information includes at least requests for media segments from the client device and determining the time between requests for media segments and the time length of each media segment.

17. The non-transitory computer readable medium of claim 16 wherein receiving user streaming information also includes media information.

18. The non-transitory computer readable medium of claim 16 wherein the user model changes based on the media information.

19. The non-transitory computer readable medium of claim 15, wherein receiving user streaming information includes the play head position for the media playing on the client device.

20. The non-transitory computer readable medium of claim 15 wherein refining a user model with the user streaming information includes at least changing a threshold level for segments in a cache based on the user streaming information.

* * * * *